United States Patent [19]
Vernooy

[11] 3,732,625
[45] May 15, 1973

[54] PIPELINE PIG
[75] Inventor: Burton Vernooy, Tulsa, Okla.
[73] Assignee: T. D. Williamson, Inc., Tulsa, Okla.
[22] Filed: Oct. 12, 1970
[21] Appl. No.: 79,808

[52] U.S. Cl. ..................................................33/141.5
[51] Int. Cl. ..............................G01b 3/12, G01b 7/04
[58] Field of Search....................33/141, 141.5, 142; 235/92, 95, 96; 324/168, 171

[56] References Cited
UNITED STATES PATENTS

| | | | |
|---|---|---|---|
| 2,834,113 | 5/1958 | Dean et al. | 33/141.5 |
| 3,195,236 | 7/1965 | Green et al. | 33/141 G |
| 3,508,433 | 4/1970 | Bustin | 73/40.5 A |
| 2,292,938 | 8/1942 | Hennessy | 33/141 G |
| 3,134,175 | 5/1964 | Potts | 33/141 G |
| 3,548,165 | 12/1970 | Linnenkamp | 324/171 |
| 2,468,696 | 4/1949 | Westberg | 324/168 |

FOREIGN PATENTS OR APPLICATIONS

| | | | |
|---|---|---|---|
| 559,397 | 3/1957 | Italy | 324/168 |
| 1,218,766 | 6/1966 | Germany | 324/168 |

OTHER PUBLICATIONS

Product Designs: Product Engineering July 31, 1961 Page 37.

Primary Examiner—Harry N. Haroian
Attorney—Hyer, Eickenroht, Thompson & Turner

[57] ABSTRACT

A pipeline pig is provided with a wheel mounted thereon to roll along the inner wall of the pipeline. A magnet is carried by the wheel for movement past a magnetic flux responsive switch carried by the wheel mounting mechanism so that as the wheel revolves, the magnet moves past the switch to actuate it and thereby provide a signal proportioned to the distance moved by the pig without any appreciable drag or torsional load on the wheel so as to cause it to tend to skid without rotation along the pipeline.

3 Claims, 4 Drawing Figures

PATENTED MAY 15 1973 3,732,625
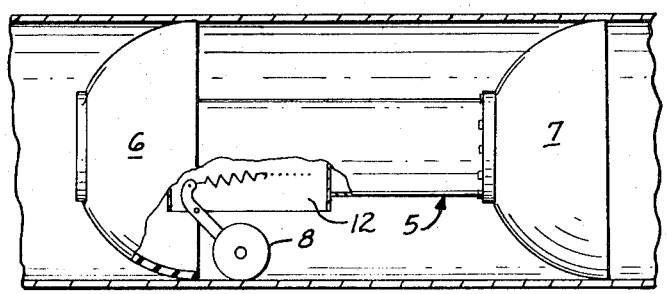
Fig_1
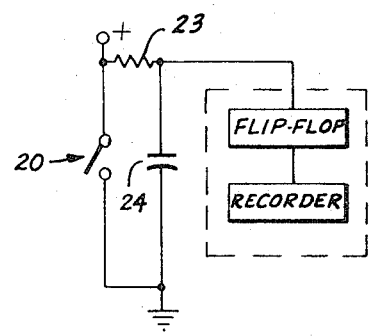
Fig_4
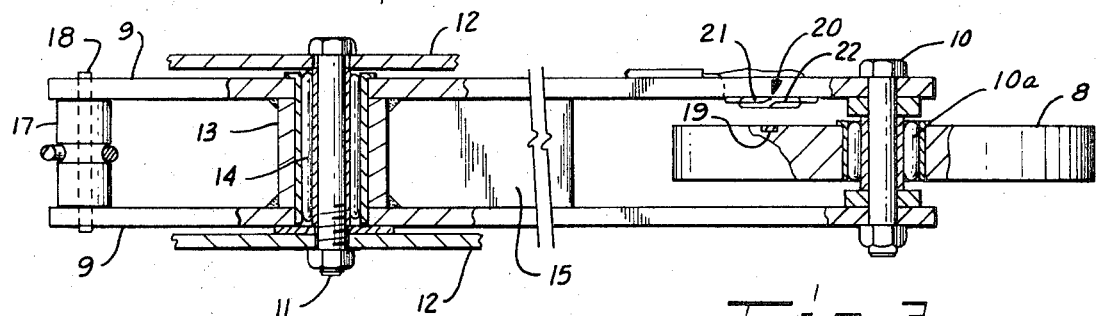
Fig_3
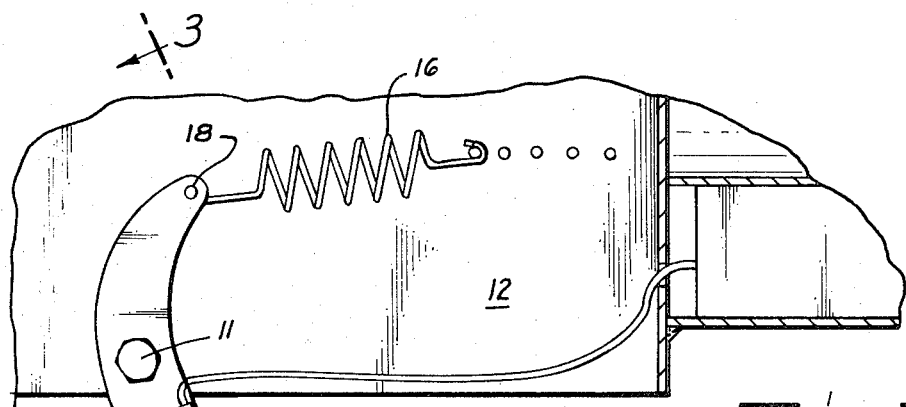
Fig_2
BURTON VERNOOY
INVENTOR.
BY Hyer, Eickenroht,
Thompson & Turner
ATTORNEYS

PIPELINE PIG

This invention relates to a pipeline pig having a wheel and magnetic arrangement mounted thereon in such a way that the distance traversed by the pig can be determined, and in one of its aspects, permitting the pig's position at any given time to be correlated with other data gathered by an instrument also carried by the pig whereby the occurrence of events generating such data can be located along the pipeline.

In the past, devices of a variety of designs have been suggested to provide an accurate means for indicating the position of a pipeline pig at a particular time while it is passing through a pipeline so that, for example, there can be a correlation of the distance travelled by the pig with the readings gathered by an instrument in the pig whereby the location of each even detected by the instrument can be located along the pipeline length with a desired degree of accuracy. Instrumented pigs are used for numerous purposes such as surveys of the pipeline for pressure variations, out-of-roundness, internal corrosion, leaks, etc. In such uses of instrumented pigs, there is the practical necessity of correlating the distance travelled by the pig at the time a given instrument records an event. For example, it is of little value to have an instrumented pig make a record that indicates there is corrosion somewhere along a buried pipeline unless a reasonably exact distance from a determinable point in the pipeline, such as the pig's point of insertion, to the corroded area can be determined. Otherwise, substantial lengths of pipeline must be inspected to find the exact location of the corrosion. To date, the designs suggested for determining an instrumented pig's location when a particular event is recorded have been impractical or excessively inaccurate.

One such suggested device involved the use of a pipe joint counter. The distance travelled by the pig using these joint counters was to be computed by multiplying the number of the pipe joints counted times the length of a standard joint. These devices were inaccurate because various lengths of pipe lengths are used and some pipe joints, especially in internally plastic coated lines, are so smooth as to not cause the device to count a joint, thereby causing error in the computation of distance.

Another device involved the use of individual radiation sources located at measured intervals along the pipeline and a radiation detector (e.g., Gieger counter) mounted in the pig to detect the individual sources as the pig passed down the line along with making a record of such detections. This was unfeasible not only because of the danger, real or imagined, of handling the radiation sources but also because of the mechanical problems of locating them along the length of the buried pipeline. Thus, the sources had to be located close to the pipe which involved either digging holes along the pipe or driving stakes with the sources at the driven ends. Either approach is cumbersome and expensive.

Another suggested design involved metering the flow of fluid through the pipeline and plotting the pig's location based on the rate of flow. However, this presupposes that there will be no leakage past the pig and, in gas lines, that the pig's rate of travel is uniform at all times.

It is an object of this invention to provide a pipeline pig which can accurately indicate the distance traversed by the pig along the pipeline.

Another object is to provide a pipeline pig which measures distance while traversing the pipeline by the use of a wheel carried by the pig wherein the revolutions of the wheel are indicated in such a manner that the wheel is not loaded, that is, it does not have to generate any significant force to drive a counter, recorder, or the like.

Another object is to provide a pig with a distance indicating device that does not require any pre-preparation of the pipeline and which gives reliably accurate results even in plastic coated lines having a very smooth interior.

Other objects, advantages, and features of the invention will be apparent to one skilled in the art upon consideration of the specification, the claims, and the appended drawings, wherein:

FIG. 1 is a general elevation of a view of a preferred embodiment of the pig made in accordance with this invention, showing the pig within a pipeline.

FIG. 2 is an enlarged view of a portion of FIG. 1;

FIG. 3 is a view along the line 3—3 of FIG. 2 with parts broken away and sectioned for clarity; and FIG. 4 is a circuit diagram illustrating one way of reading out and recording the instantaneous position of the pig.

Referring to FIG. 1, the pig is shown as including a central body portion 5 and means for supporting the body in the pipeline and for impeding flow of pipeline fluid past the pig so that the pig will be propelled by such fluid along the pipeline. Such means is here shown as sealing cups 6 and 7 shaped as hollow hemispheres and adapted to sealingly engage the inner wall of the pipeline. Alternatively, the body could by enlarged to obstruct the major portion of the flow and not require sealing cups. The pig body 5 can be hollow to receive various instrumentation packages as well as recording means.

The pig is provided with a wheel 8 whose function is to roll without significant slippage along the inner wall of the pipeline as the pig is propelled through the line. Then by counting the number of revolutions of the wheel, an accurate measurement of the distance the pig has travelled from one point to another can be determined thereby permitting a determination of the pig's location at any particular time. This, of course, presupposes that the wheel does not skid or slip along the pipeline wall and that for each revolution of the wheel, the pig will have moved down the line a distance equal to the circumference of the wheel.

Means are provided mounting the wheel on the pig body for free rotation with respect to the pig body. One or more of the wheels can be mounted directly on the body in such a manner that at least one of the wheels rollingly engages the inner wall of the pipeline at all times (except, e.g., for short distances as when passing a side opening). However, it may be preferred in some cases that the mounting means also resiliently bias the wheel outwardly of the pig body for rolling engagement with the inner wall of the pipeline as the pig moves therealong. As illustrated in the drawings, this means includes a pair of parallel arms 9 presenting a bifurcated outer end in which the wheel is mounted. Such mounting may be by a suitable bolt 10 passing through the wheel. A suitable low friction bearing 10a should be disposed between the wheel and its axle furnished by bolt 10 so that the wheel can rotate quite freely on its axle with a minimum of rotative frictional resistance.

In a preferred embodiment, the arms 9 are pivotally connected to the pig body so that the wheel will swing in a circular arc toward and away from the pipeline wall. Thus a bolt 11 can pass through side plates 12 and a suitable opening in the arm assembly to pivotally mount the latter on the pig's body. Preferably, a spacer ring 13 and a low friction bearing 14 is provided to minimize the frictional resistance to pivotal movement of the arms. A suitable brace 15 can be provide/ to lend further rigidity to the arm assembly.

The resilient bias for the arms can be provided by a spring 16 having one of its ends fastened to the pig body and the other end to the inner end of arms 9 by hooking around a ferrule 17 rotatably mounted on a pin 18.

The diameter of the wheel and the arrangement of the mounting means are such that when the wheel is biased into a side opening in the pipeline, only the wheel engages the terminus of the side opening (e.g., the wall of a side outlet pipe). This permits the wheel to move or roll out of the side opening without the mounting means engaging or striking against anything. Preferably, stop means are provided to limit outward movement of the wheel so that when it is in its outermost position, as in a side opening, its axis is radially inward of the inner wall of the pipeline. This facilitates rolling of the wheel up out of the side opening to minimize the stress placed on the entire assembly. Such an arrangement is illustrated in FIG. 2 with the wheel in its outermost position and the stop means being provided by cup 6.

Alternatively, the stop means can be eliminated by making the arms 9 short enough between bolts 10 and 11 so that the axis of the wheel is always radially inward as above defined. However, such design would find use primarily in relatively straight pipelines because the shortened arms may cause the wheel to lose contact with the pipe wall while the pig is traversing sharp bends with the wheel rolling on the long wall of the bend.

A magnetic flux means is mounted on the wheel to move past a portion of the wheel mounting means for each revolution of the wheel. Preferably this magnetic flux means is a small permanent magnet 19 attached to one side face of the wheel. A magnetic flux responsive means is situated on the mounting means so that the magnet on the wheel will move therepast for each revolution of the wheel. Such flux responsive means is preferably a magnetic switch 20 of the reed type illustrated schematically in the drawings as including spring contacts 21 and 22 arranged in a normally open position but so that when the magnet exerts its flux field on the switch, one of the contacts will move into contact with the other thereby closing the circuit. The switch 20 is situated in the circuit as shown in FIG. 4 which includes a low pass filter comprised of resistance 23 and capacitance 24 which filters out undesired noise in the circuit which might cause it to operate and thereby erroneously cause an indication of a revolution of the wheel. The output of the filter can pass to a conventional bistable flip-flop circuit which provides an output pulse for each revolution of the wheel. These output pulses can be used to advance the recording medium, such as paper or film, one stop per pulse so that should the pig hangup in the pipeline, the output pulses would cease and the recording medium would not be unnecessarily wasted as it would be if it were driven by a constant speed device.

With the foregoing arrangement, it will be seen that as the pig is propelled along the pipeline, wheel 8 will revolve to move magnet 19 past switch 20 once each revolution of the wheel. This provides a series of output pulses which are proportional in number to the distance moved by the pig. This arrangement results in what can be termed an essentially "no load" condition for the wheel in that it need not generate any significant force for driving a counting arrangement and therefore can roll along the pipeline without any tendency to slip therealong as might be the case if a substantial torsional load was imposed on the wheel. Also, the magnet-switch arrangement is one which is not susceptible of malfunction due to exposure to dirty fluids, debris, etc., as occur in many pipelines.

The "no load" feature also permits the degree of bias of the wheel into contact with the pipeline to be minimized at a reasonably low value, which in some cases would be only a portion of the weight of the pig rolling thereon as when the wheel is directly connected to the pig body. Then when the wheel encounters a side opening in the pipeline, as at a tee, and moves out into such opening, less force is required to cam the wheel back into operating position as the pig moves away from the opening. Also, and of possibly greater importance is that excessive bias increases the frictional resistance of the wheel to rotation due to loading of the wheel bearing thereby causing slippage of the wheel which, even though it may be relatively small for short distances, can be significant when accumulated over a distance of several miles.

From the foregoing description of one embodiment of this invention by way of example, it will be seen that this invention is one well adapted to attain all of the ends and objects hereinabove set forth, together with other advantages which are obvious and which are inherent to the apparatus and structure.

I claim:

1. A pipeline pig for indicating the distance from one point to another point or points in a pipeline, comprising a central pig body portion, means carried by the pipe including at least one pig cup having an outer circumferential resilient portion slidably engageable with an inner wall of the pipeline for supporting the body portion in the pipeline and for impeding flow of pipeline fluid past the pig so that the pig can be propelled forwardly by such fluid along the pipeline, an arm pivotally connected to the body portion for swinging about an axis transverse to the axis of the pipeline pig, a wheel mounted on the arm for rotation about the central axis of the wheel, resilient means mounted on the body and acting on the arm to urge the wheel to swing with the arm forwardly and outwardly into rolling engagement with the inner wall of the pipeline, and, when the cup traverses a side opening in the pipeline and the wheel moves out of engagement with the inner wall and into said opening, to swing further forwardly and outwardly into engagement with the resilient portion of the cup, so that said portion acts to absorb shock on the wheel, said arm being of such length that, when the wheel is engaged with the cup portion, its central axis is disposed radially inwardly of the outward diameter thereof, so that the angle of attack between the front edge of the side opening and the front edge of the wheel will be relatively small, a magnet carried by the wheel for movement past a portion of the arm for each revolution of the wheel, and magnetic flux responsive means situated at said portion of the arm and adapted to be actuated by passage of the magnet therepast to produce a signal representing a predetermined revolution of said wheel whereby an accumulation of said signals is indicative of the distance travelled by the pig.

2. A pipeline pig of the character defined in claim 1, wherein said magnetic flux responsive means includes a reed switch.

3. A pipeline pig of the character defined in claim 2, wherein said resilient means comprises a coil spring extending between the body portion and arm in a direction generally parallel to the axis of the pipeline pig and thus in a position to be expanded and contracted to a minimum extent during swinging movement of the wheel between positions engaged with varying inner diameters of the inner wall of the pipeline.

* * * * *